US009948470B2

(12) United States Patent
Guo et al.

(10) Patent No.: US 9,948,470 B2
(45) Date of Patent: Apr. 17, 2018

(54) APPLYING CIRCUIT DELAY-BASED PHYSICALLY UNCLONABLE FUNCTIONS (PUFS) FOR MASKING OPERATION OF MEMORY-BASED PUFS TO RESIST INVASIVE AND CLONE ATTACKS

(71) Applicant: QUALCOMM Incorporated, San Diego, CA (US)

(72) Inventors: Xu Guo, San Jose, CA (US); David M. Jacobson, San Diego, CA (US); Yafei Yang, Escondido, CA (US); Adam J. Drew, Oceanside, CA (US); Brian Marc Rosenberg, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/011,255

(22) Filed: Jan. 29, 2016

(65) Prior Publication Data

US 2016/0149712 A1 May 26, 2016

Related U.S. Application Data

(62) Division of application No. 13/975,082, filed on Aug. 23, 2013, now Pat. No. 9,787,480.

(51) Int. Cl.
*H04L 9/32* (2006.01)
*H04L 29/06* (2006.01)
*G06F 7/58* (2006.01)

(52) U.S. Cl.
CPC ............ *H04L 9/3278* (2013.01); *G06F 7/588* (2013.01); *H04L 63/08* (2013.01);
(Continued)

(58) Field of Classification Search
CPC ... H04L 9/3278; H04L 9/0866; H04L 9/3271; H04L 63/105; G06F 21/31
(Continued)

(56) References Cited

U.S. PATENT DOCUMENTS 7,702,927 B2 * 4/2010 Devadas ................. G06F 21/31
713/191
8,418,006 B1 4/2013 Trimberger
(Continued)

FOREIGN PATENT DOCUMENTS

CN 1938957 A 3/2007
CN 101263503 A 9/2008
(Continued)

OTHER PUBLICATIONS

Holcomb D.E., et al., "Power-Up SRAM State as an Identifying Fingerprint and Source of True Random Numbers", IEEE Transactions on Computers, vol. 57, No. 11, Nov. 2008, pp. 1-14.
(Continued)

*Primary Examiner* — Hadi Armouche
*Assistant Examiner* — Bryan Wright
(74) *Attorney, Agent, or Firm* — Loza & Loza LLP

(57) ABSTRACT

An authentication device is provided that authenticates an electronic device based on the responses from distinct types of physically unclonable functions. The authentication device receives a device identifier associated with the electronic device. It then sends one or more challenges to the electronic device. In response, the authentication device receives one or more responses from the electronic device, the one or more responses including characteristic information generated from two or more distinct types of physically unclonable functions in the electronic device.

21 Claims, 12 Drawing Sheets

(52) U.S. Cl.
CPC ...... *H04L 63/0853* (2013.01); *H04L 63/0876* (2013.01); *H04L 63/0884* (2013.01)

(58) Field of Classification Search
USPC ........................................................ 713/168
See application file for complete search history.

(56) References Cited

U.S. PATENT DOCUMENTS

| | | | | |
|---|---|---|---|---|
| 8,667,265 | B1* | 3/2014 | Hamlet | H04L 9/0866 326/80 |
| 2003/0204743 | A1 | 10/2003 | Devadas et al. | |
| 2006/0209584 | A1 | 9/2006 | Devadas et al. | |
| 2008/0260152 | A1 | 10/2008 | Skoric et al. | |
| 2008/0279373 | A1 | 11/2008 | Erhart et al. | |
| 2009/0083833 | A1 | 3/2009 | Ziola et al. | |
| 2009/0217045 | A1 | 8/2009 | Skoric et al. | |
| 2009/0271860 | A1* | 10/2009 | Nonaka | H04L 9/3278 726/16 |
| 2010/0122353 | A1 | 5/2010 | Koushanfar et al. | |
| 2010/0127822 | A1 | 5/2010 | Devadas | |
| 2011/0055649 | A1* | 3/2011 | Koushanfar | G06F 21/577 714/729 |
| 2011/0066670 | A1 | 3/2011 | Yu | |
| 2012/0066515 | A1 | 3/2012 | Kasuya | |
| 2012/0131340 | A1 | 5/2012 | Teuwen et al. | |
| 2012/0183135 | A1 | 7/2012 | Paral et al. | |
| 2013/0019324 | A1 | 1/2013 | Tehranipoor et al. | |
| 2014/0041040 | A1 | 2/2014 | Potkonjak et al. | |
| 2014/0091832 | A1* | 4/2014 | Gotze | H03K 19/003 326/8 |
| 2014/0279532 | A1* | 9/2014 | Tremlet | G06F 21/73 705/44 |
| 2014/0327469 | A1* | 11/2014 | Pfeiffer | H03K 19/003 326/8 |
| 2015/0058928 | A1 | 2/2015 | Guo et al. | |
| 2015/0269378 | A1* | 9/2015 | Falk | H04L 9/3278 726/6 |

FOREIGN PATENT DOCUMENTS

| | | |
|---|---|---|
| CN | 102521538 A | 6/2012 |
| CN | 103020552 A | 4/2013 |
| DE | 102012216677 B3 | 6/2013 |
| EP | 2456121 A2 | 5/2012 |
| EP | 2615571 A1 | 7/2013 |
| WO | WO-2007063473 A1 | 6/2007 |

OTHER PUBLICATIONS

International Search Report and Written Opinion—PCT/US2014/051718—ISA/EPO—dated Nov. 6, 2014.

Katzenbeisser S., et al., "PUFs: Myth, Fact or Busted? A Security Evaluation of Physically Unclonable Functions (PUFs) Cast in Silicon," Cryptographic Hardware and Embedded Systems (CHES), 2012, pp. 283-301.

Maes R., et al., "Physically Unclonable Functions: A Study on the State of the Art and Future Research Directions" In: "Towards Hardware-Intrinsic Security", Jan. 1, 2010 (Jan. 1, 2010), Springer Berlin Heidelberg, Berlin, Heidelberg, XP055149570, ISSN: 1619-7100,ISBN: 978-364-214452-3, pp. 1-36, DOI:10.1007/978-3-642-14452-3_1.

* cited by examiner

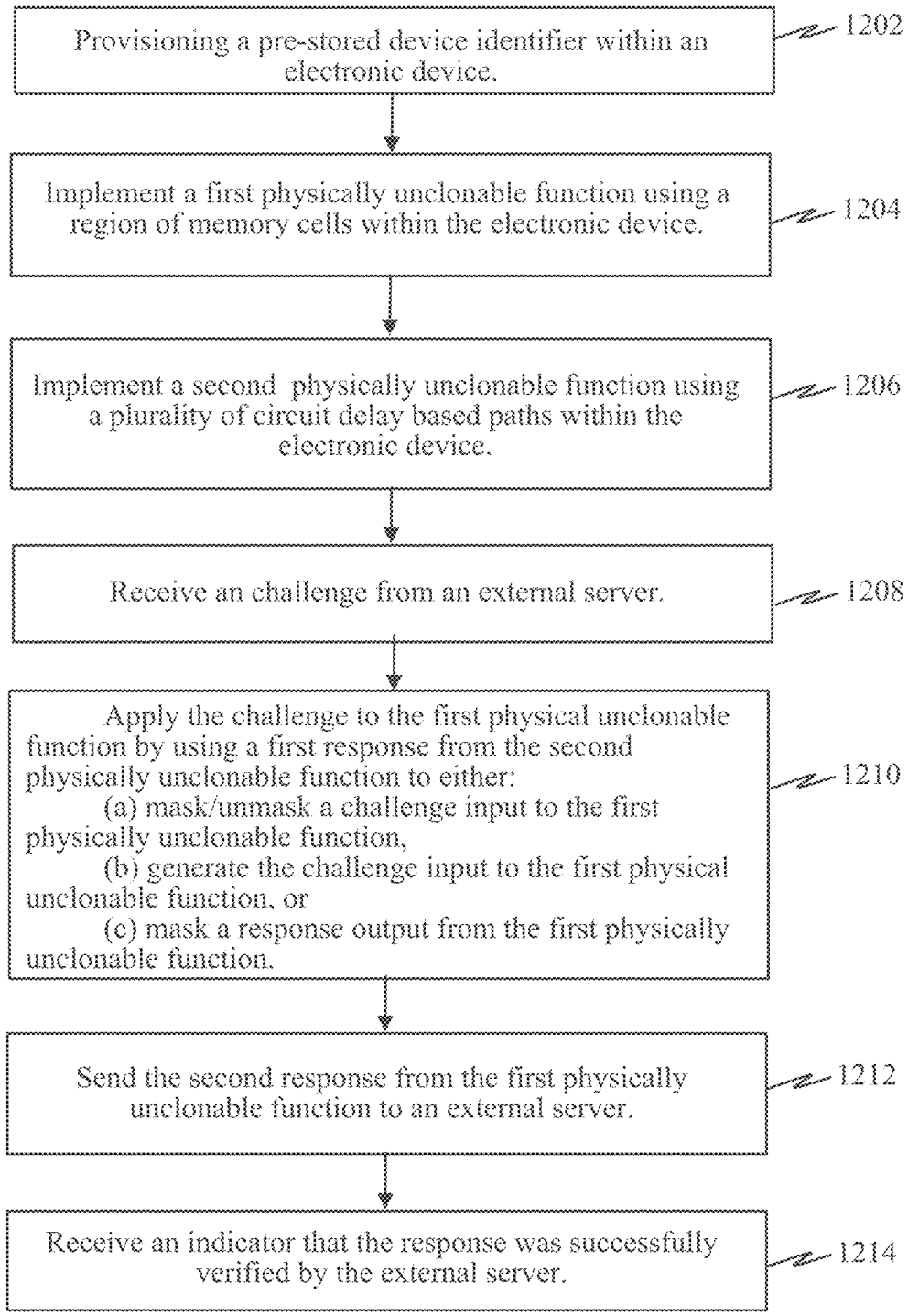
FIG. 12 — *Method Operational by Electronic Device*

APPLYING CIRCUIT DELAY-BASED PHYSICALLY UNCLONABLE FUNCTIONS (PUFS) FOR MASKING OPERATION OF MEMORY-BASED PUFS TO RESIST INVASIVE AND CLONE ATTACKS

CROSS-REFERENCE TO RELATED APPLICATIONS

The present application claims priority to, and is a Divisional of Application of, U.S. Ser. No. 13/975,082 filed Aug. 23, 2013.

BACKGROUND

Field

The present disclosure pertains to the use of physically unclonable functions (PUFs) to uniquely identify a memory device or device into which such memory device is integrated.

Background

Physical Unclonable functions (PUFs) provide a mechanism to uniquely identify a hardware device based on intrinsic variations of physical components. When multiple chips are manufactured, the complex semiconductor manufacturing process introduces slight variations that are beyond the control of the designer. For instance, even if two chips are manufactured from the same silicon wafer, electrical paths designed to be the same will probably differ in width by a few nanometers; microscopic differences in the surface of the silicon will induce almost trivial variations in the curvature of lines. As these unique characteristics are uncontrollable and inherent to the physical device, quantifying them can produce an intrinsic identifier. Several different types of PUFs have been proposed based on exploration and analysis of silicon variations in circuit delays, such as ring oscillator based PUFs, arbiter PUFs, and path delay analysis based PUFs.

One PUF makes use of the uninitialized power-up state of a static random access memory (SRAM) to generate an identifying "fingerprint". However, the SRAM PUFs are susceptible to cloning attacks.

Consequently, there is a need to improve the security of current SRAM PUF designs to resist cloning attacks and invasive attacks in general.

SUMMARY

An authentication device is provided that authenticates an electronic device based on the responses from distinct types of physically unclonable functions. The authentication device receives a device identifier associated with the electronic device. It then sends one or more challenges to the electronic device. In response, the authentication device receives one or more responses from the electronic device, the one or more responses including characteristic information generated from two or more distinct types of physically unclonable functions in the electronic device. The pre-stored responses specific to the electronic device may be identified using the electronic device identifier. The electronic device may then be authenticated by comparing the pre-stored responses and the received one or more responses for the electronic device. The challenges may be selected from a plurality of challenges for which responses where previously obtained from the electronic device. The pre-stored responses may have been obtained at a manufacturing stage or pre-deployment stage of the electronic device. The device identifier may be received prior to sending the one or more challenges. The device identifier may be received along with receiving the one or more responses.

The challenge may include a first challenge for a first physically unclonable function and a second challenge for a second physically unclonable function. The first challenge may be a challenge masked by an expected response to second challenge. The one or more challenges may include a first challenge for a first physically unclonable function and a second challenge for a second physically unclonable function, the one or more responses include a first response from the first physically unclonable function and a second response from the second physically unclonable function, the electronic device is successfully authenticated if the first response matches a first pre-stored response corresponding to the first challenge and the second response matches a second pre-stored response corresponding to the second challenge.

The one or more challenges include a first challenge for a first physically unclonable function and a second challenge for a second physically unclonable function, the one or more responses include a first response from the first physically unclonable function and a second response from the second physically unclonable function. Additionally, an intermediate challenge may be obtained by unmasking the first challenge with the second response. The received first response may be compared to the pre-stored response associated with the intermediate challenge.

In yet another example, the one or more challenges include a first challenge for a second physically unclonable function, the one or more responses include a first response from the first physically unclonable function. An intermediate challenge may be obtained by retrieving a pre-stored intermediate response corresponding to the first challenge. The received first response may be compared to a pre-stored intermediate response corresponding to the intermediate challenge.

In yet another example, the one or more challenges include a first challenge for a first physically unclonable function and a second challenge for a second physically unclonable function, the one or more responses include a first response. An intermediate response may be obtained by unmasking the first response with a pre-stored second response corresponding to the second challenge. The intermediate response is compared to a pre-stored response associated with the first challenge.

BRIEF DESCRIPTION OF THE DRAWINGS

FIG. 12 illustrates a method operational in an electronic device for authenticating itself with an authentication device based on a response from a plurality of physically unclonable functions.

DETAILED DESCRIPTION

Figure 1:
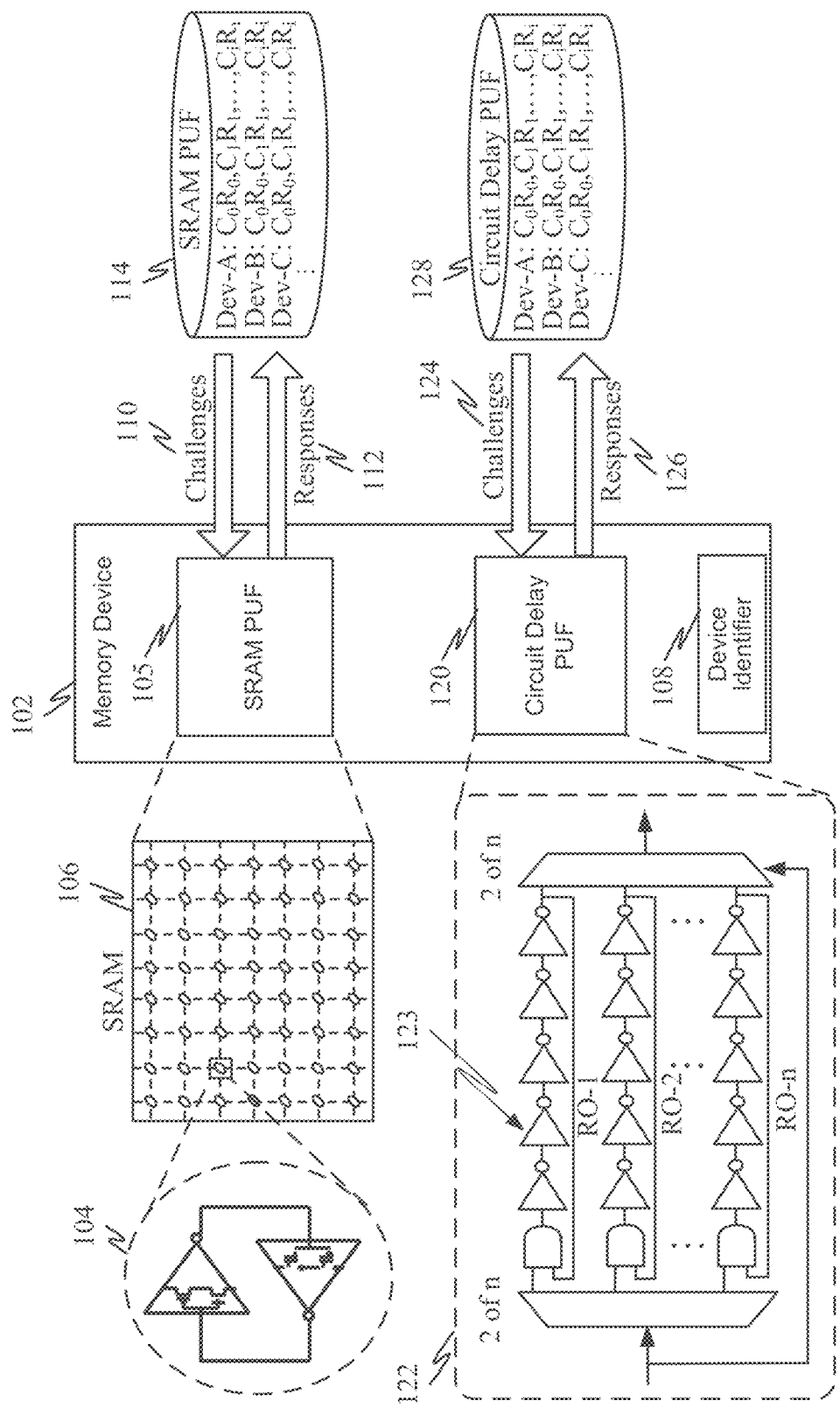
FIG. 1 is a block diagram illustrating an exemplary way of generating a unique mapping of responses for a memory device based on a SRAM PUF and a Circuit Delay Based PUF.

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation.

Overview

One feature provides for generating a unique identifier by combining static random access memory (SRAM) PUFs and circuit delay based PUFs (e.g., ring oscillator (RO) PUFs, arbiter PUFs, etc.). SRAM PUFs by themselves may be susceptible to cloning attacks that use failure analysis tools (e.g., a Focused Ion Beam (FIB)). Therefore, circuit delay based PUFs may be used to conceal either a challenge to, and/or response from, the SRAM PUFs, thereby inhibiting an attacker from being able to clone a memory device's response.

Combining SRAM and Circuit Delay Based Physically Unclonable Functions (PUFs)

A Physical Unclonable Function (PUF) is a challenge-response mechanism exploiting manufacturing process variations within circuits to obtain a unique identifier. In one example, the relation between a challenge and the corresponding response is determined by complex, statistical variations in logic components and interconnects in a circuit (e.g., integrated circuit). Two types of PUFs include, for example, an SRAM PUF and a circuit delay PUF (e.g., Ring Oscillator PUF).

An SRAM PUF exploits the uninitialized power-up state of a static random access memory (SRAM) to generate an identifying "fingerprint" for a memory device or an electronic device into which the memory device is integrated. While SRAM cell design is symmetrical, the manufacturing process deviations lead to a small asymmetry between SRAM cells, resulting in a preferred/biased state (0 or 1) during startup. This preference or bias of uninitialized SRAM cells may be used to uniquely identify a memory device.

However, recent advances in failure analysis attacks using a Focused Ion Beam (FIB) threaten the security of memory-based PUFs. A circuit edit attack could produce a hardware clone with identical SRAM PUF response to an original device.

Circuit delay based PUFs exploit systematic variations between oscillation circuits caused by fabrication/manufacturing imperfections. While fabrication/manufacturing processes seek to avoid such variations in circuit delay based PUFs, they are always present to some extent and are actually useful to identify devices/chips. In one example of a circuit delay based PUF, a plurality of ring oscillators may be concurrently used and the outputs of at least two ring oscillators are sent to one or more switches (multiplexers). The challenge may serve as input to the ring oscillators (e.g., challenge serves to select two ring oscillators) and the output from two selected ring oscillators 204 are represented as a first frequency and a second frequency. Because of differences between the selected ring oscillators, their frequencies will be different (i.e., resulting in a frequency differential). The RO PUF output (response) is created by a pair-wise comparison of the ring oscillator frequencies (e.g., difference between first and second frequency).

However, implementing a sizable circuit delay based PUF takes up much needed space in an integrated circuit.

According to one feature, an SRAM PUF and a circuit delay based PUF are combined within an electronic device (e.g., memory device, semiconductor device, etc.) to enhance the security of the SRAM PUF.

FIG. 1 is a block diagram illustrating an exemplary way of generating a unique mapping of responses for a memory device based on a SRAM PUF and a Circuit Delay Based PUF, e.g., Ring Oscillator (RO) PUF. This block diagram illustrates the process of querying and collecting challenge/response characteristics for a memory device 102 (e.g., chip, semiconductor device, etc.) comprising an SRAM PUF 105 and a Circuit Delay PUF 122 (e.g., implemented as a ring oscillator bank).

In one example, the SRAM PUF may be implemented from all or parts of the SRAM cells of the memory device 102. In particular, the SRAM PUF 105 makes use of biasing in uninitialized memory cells 104 of the SRAM 106. For instance, during a manufacturing stage, the uninitialized SRAM 106 may be queried such that for each challenge 110 (e.g., memory address), a corresponding response 112 (e.g., logical 0 or 1) is obtained. For example, for each memory address within the SRAM 106 the uninitialized value/state for the memory cell 104 associated with that memory address is obtained. For a plurality of challenges 110, a plurality of responses 112 are obtained. In other approaches, just a subset of the memory addresses may be queried. In this manner, a mapping of uninitialized values to addresses is built for the SRAM 106 and may be stored in a database 114 (e.g., as challenges and corresponding responses). That is, a database of SRAM PUF challenges/responses 114 may be built for each memory device (chip), for example, during a manufacturing or quality control process. For instance, for a Device-A a first set of challenges/responses $[C_0R_0, C_1R_1, \ldots, C_iR_i]$ is obtained, for a Device-B a second set of challenges/responses $[C_0R_0, C_1R_1, \ldots, C_iR_i]$ is obtained, and for a Device-C a third set of challenges challenges/responses $[C_0R_0, C_1R_1, \ldots, C_iR_i]$ is obtained. Note that in some implementations, the challenges $[C_0, C_1, \ldots, C_i]$ for all devices may be the same, but the responses would be different. In other implementations, the challenges $[C_0, C_1, \ldots, C_i]$ for each device may be randomly selected, so different devices receive different challenges.

In one example, the circuit delay PUF 120 may be implemented as a Ring Oscillator (RO) PUF 122 which makes use of a plurality of ring oscillators 123 and their frequency variations to generate a unique signature/response. For instance, for a given challenge 124 (e.g., selection of two ring oscillator inputs/outputs) a corresponding response (e.g., a frequency difference between the two selected ring oscillators) is obtained. In this manner, a circuit delay PUF database 128 of challenges and corresponding responses are obtained.

Because uninitialized memory cell states of the SRAM 106 are susceptible to being cloned by a focused ion beam (FIB) attack, using just the SRAM PUF 105 to provide a unique identifier for the memory device 102 is insecure. However, unlike the SRAM PUF 105, the circuit delay PUF 120 (e.g., RO PUF 122) is not susceptible to being cloned, but using a large number of RO PUFs is undesirable as they take up space on a chip. Consequently, a relatively small number of ring oscillators 123 may be combined with SRAM PUF 105 on a memory device 102 (e.g., chip, semiconductor, etc.) to thwart against cloning attacks on the SRAM PUF 102.

In order to associate the challenges/responses with each device, a device identifier 108 (e.g., serial number, ID number, etc.) may be stored at the device 102 and known to, or stored at, the databases 114 and 128. That is, the device identifier 108 for each memory device 102 may be stored and associated with the corresponding challenges and/or responses for that memory device 102.

Figure 2:
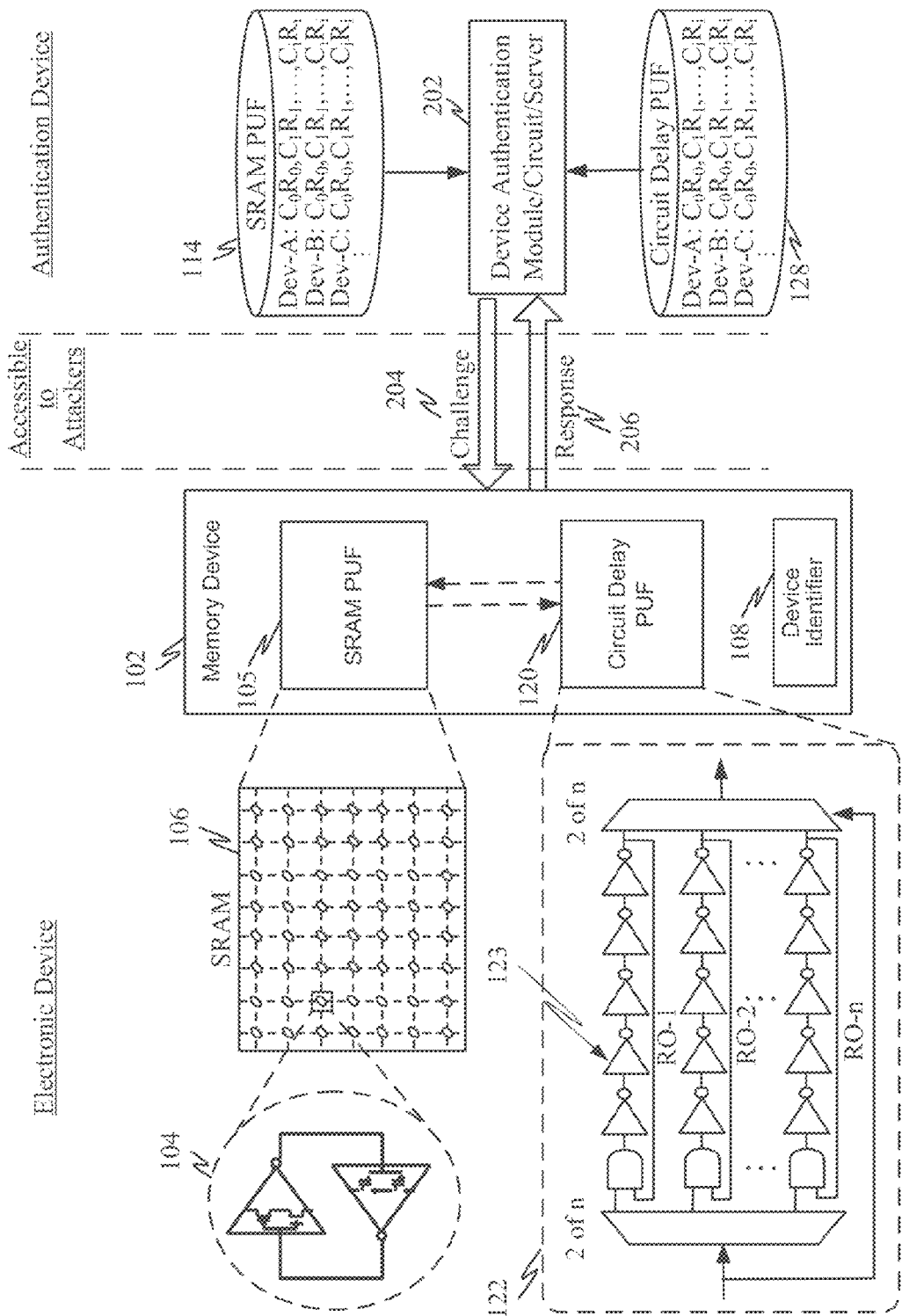
FIG. 2 is a block diagram illustrating an exemplary way of verifying or identifying a particular memory device using previously obtained characteristic responses for the memory device which combines a SRAM PUF and a Circuit Delay Based PUF.

FIG. 2 is a block diagram illustrating an exemplary way of verifying or identifying a particular memory device using previously obtained characteristic responses for the memory device which combines a SRAM PUF and a Circuit Delay Based PUF, e.g., Ring Oscillator (RO) PUF. During operation, a device verification module/circuit 202 (e.g., implemented by a verifier or authentication device/server) may query the memory device 102 with a challenge 204 to obtain a response 206 which can be verified using the combination of SRAM PUF database 114 and Circuit Delay PUF database 128. The response 206 may serve to verify the identity of the memory device or to authenticate the memory device 102. Note that this technique may also serve to generate a unique identifier/signature for the memory device.

Note that, in one example, the memory device 102 may provide its pre-stored/pre-assigned device identifier 108 to the device authentication module/circuit/server 202. The device authentication module/circuit/server 202 may then retrieve one or more challenges previously stored for that device identifier 108 and sends 204 them to the memory device 102. Alternatively, the device identifier 108 is provided by the electronic device along with any responses to challenges (e.g., where the same challenges are used for all electronic devices). Upon receipt of the response 206, the device authentication module/circuit/server 202 compares the received response 206 to the corresponding previously stored response(s) in the SRAM PUF 114 and Circuit Delay PUF 128 to ascertain whether there is a match.

During this verification stage, the challenge 204 and response 206 may be accessed or accessible to an attacker. Therefore, various features provide for protecting challenges 204 and/or responses 206 to/from the memory device 102 in order to inhibit an attacker from cloning the memory device 102.

In one example, the circuit delay PUF 120 (e.g., a delay-based PUF) is tamper-resistant. While a focused ion beam (FIB) attack may expose the responses of memory cells of the SRAM PUF 105, it does not provide information about the circuit delay PUF 120 (e.g., ring oscillators). In fact, the process used to clone/attack the memory device 102 may be sufficiently invasive that it may change the response of the circuit delay PUF 120 (e.g., ring oscillators), thereby exposing the attack and causing a failure of authentication/identification of the memory device 102.

There are various ways to combine the SRAM PUF 105 and circuit delay PUF 120 to inhibit an attacker from cloning of the memory device 102 even when the challenges 204 and responses 206 are accessible to the attacker.

Combining SRAM and RO Physically Unclonable Functions (PUFs) to Mask Challenges

Figure 3:
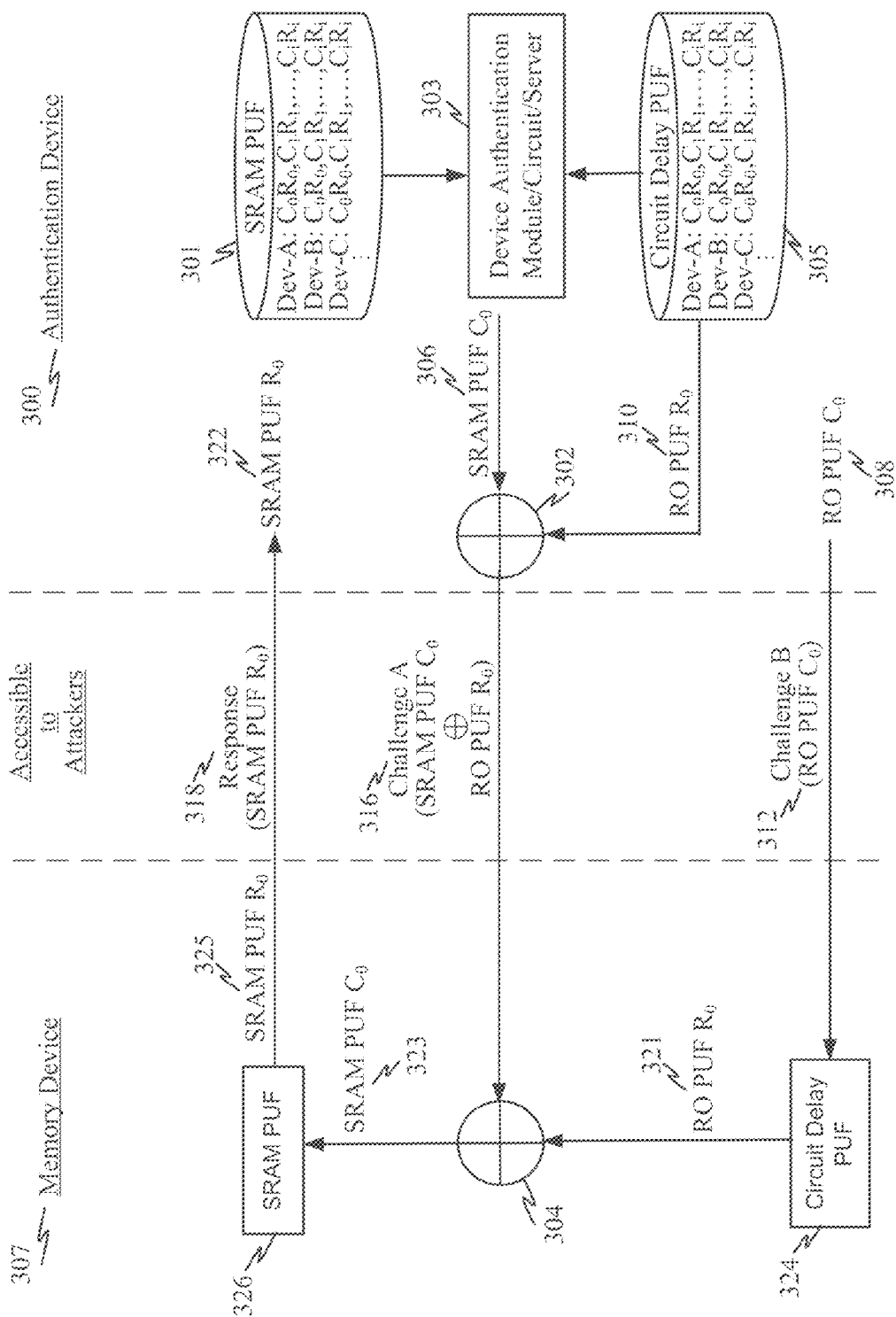
FIG. 3 is a block diagram illustrates a first example of how an SRAM PUF and a Circuit Delay PUF may be combined to prevent an attacker from being able to clone a memory device.

FIG. 3 is a block diagram illustrates a first example of how an SRAM PUF 326 and a Circuit Delay PUF 324 may be combined to prevent an attacker from being able to clone a memory device 307. In this example, an authentication device 300 may include a device authentication module/circuit/server 303, a SRAM PUF database 301, and a Circuit Delay PUF database 305. The SRAM PUF database 301 may be generated for a memory cell region of the memory device 307 during manufacturing by, for example, sending a plurality of challenges (e.g., memory addresses) to the memory cell region and obtaining corresponding responses (e.g., uninitialized memory cell states/values). Similarly, the Circuit Delay PUF database 305 may be generated for a plurality of ring oscillator within the memory device 307 during manufacturing by, for example, sending a plurality of challenges (e.g., selection of two ring oscillators) to the ring oscillators and obtaining a corresponding responses (e.g., frequency differential between two selected ring oscillators).

In this example, when the device authentication module/circuit/server 303 subsequently tries to authenticate the memory device 307, it sends a challenge (comprising Challenge A 316 and Challenge B 312) to the memory device 307. The challenge A 316 may comprise an SRAM PUF challenge $C_0$ 306 and a RO PUF response $R_0$ 310 that have been combined by a XOR operation 302. Because this Challenge A 316 may be accessible by an attacker, one aspect obscures the actual SRAM PUF challenge $C_0$ 306 by masking (e.g., XORing) it with a corresponding RO PUF response $R_0$ 310 (obtained from the Circuit Delay PUF database 305) to generate the transmitted (exposed) challenge A 316. Additionally, challenge B 312 which includes an RO PUF challenge $C_0$ 308, corresponding to the RO PUF response $R_0$ 310, is also sent from the authentication device 300 to the memory device 307.

At the memory device 307, the RO PUF challenge $C_0$ 312 is used to generate a RO PUF response $R_0$ 321 from the circuit delay PUF 324. Challenge A 316 is then XORed 304 with the RO PUF response $R_0$ 321 to obtain the actual (clear) SRAM PUF challenge $C_0$ 323 which may be used as the challenge for the SRAM PUF 326. The SRAM PUF 326 then generates a response SRAM PUF $R_0$ 325. In this manner, a response from the memory device 307 to the authentication device 300 may include SRAM PUF response $R_0$ 318.

At the authentication device 300, the received response SRAM PUF $R_0$ 322 may be used to compare to the stored responses in the SRAM PUF database 301 and Circuit Delay PUF 305 and ascertain whether they match. Note that since the RO PUF response $R_0$ 310 is already known or stored in the circuit delay PUF database 305, the authentication device 300 is able to use it to mask the SRAM PUC challenge $C_0$ 306 with it.

Figure 4:
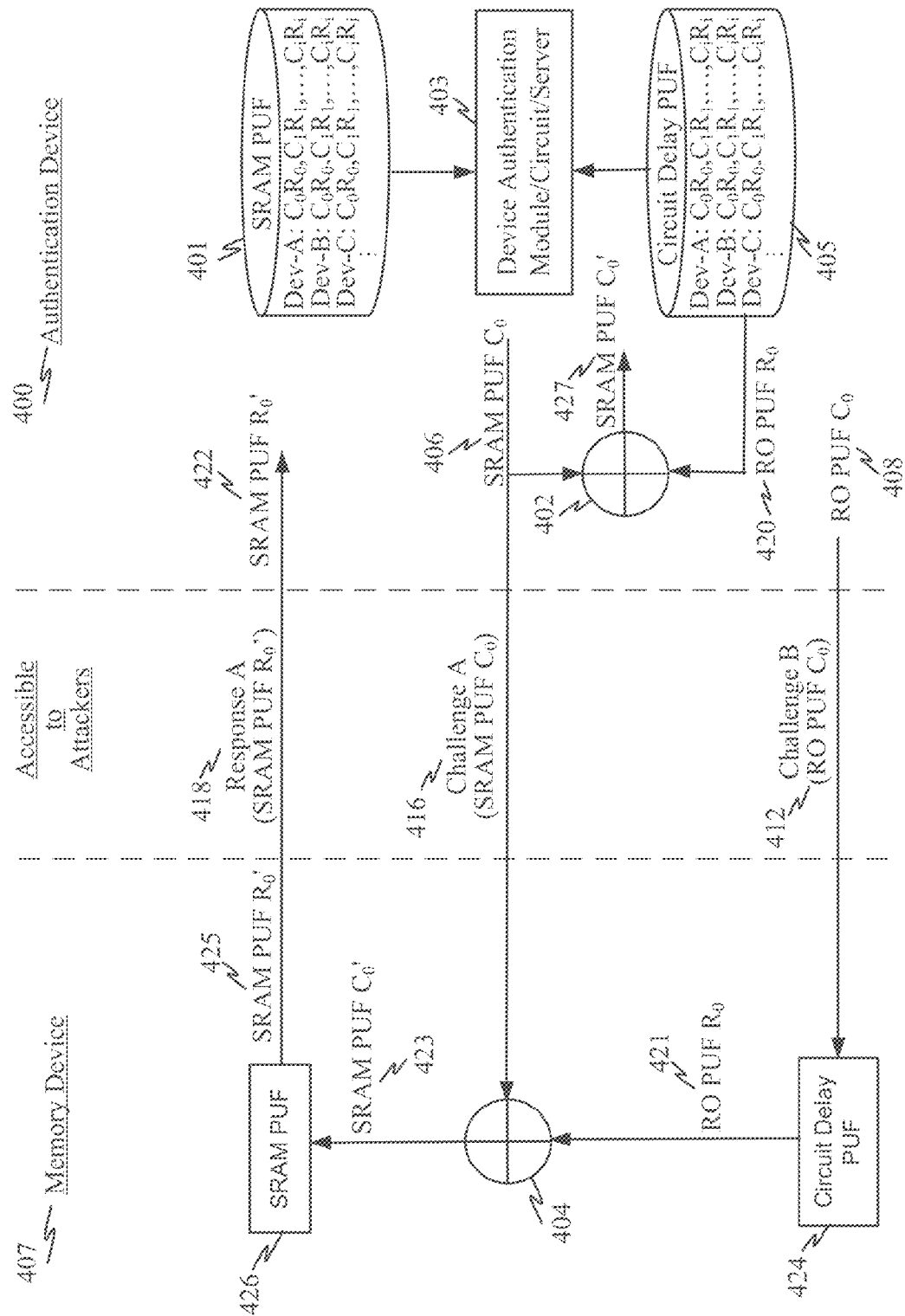
FIG. 4 is a block diagram illustrates a second example of how a SRAM PUF and a circuit delay PUF may be combined to prevent an attacker from being able to clone a memory device.

FIG. 4 is a block diagram illustrates a second example of how a SRAM PUF 426 and a circuit delay PUF 424 may be combined to prevent an attacker from being able to clone a memory device 407. Unlike the example in FIG. 3, in this example the SRAM PUF challenge $C_0$ 406 and RO PUF challenge $C_0$ 408 are sent on the clear from the device authentication module/circuit/server 403 to the memory device 407. In this example, an authentication device 400 may include a device authentication module/circuit/server 403, a SRAM PUF database 401, and a Circuit Delay PUF database 405. The SRAM PUF database 401 may be generated for a memory cell region of the memory device 407 during manufacturing by, for example, sending a plurality of challenges (e.g., memory addresses) to the memory cell region and obtaining corresponding responses (e.g., uninitialized memory cell states/values). Similarly, the Circuit Delay PUF database 405 may be generated for a plurality of ring oscillator within the memory device 407 during manufacturing by, for example, sending a plurality of challenges (e.g., selection of two ring oscillators) to the ring oscillators and obtaining a corresponding responses (e.g., frequency differential between two selected ring oscillators).

In this example, when the device authentication module/circuit/server 403 subsequently tries to authenticate the memory device 407, it sends a challenge (comprising Challenge A 416 and Challenge B 412) to the memory device 407. The challenge A 416 may comprise an SRAM PUF challenge $C_0$ 406. The challenge B 412 includes an RO PUF challenge $C_0$ 408, corresponding to the RO PUF response $R_0$ 410, is also sent from the authentication device 400 to the memory device 407.

While challenge A 416 may be accessible by an attacker, one aspect modifies the actual SRAM PUF challenge $C_0$ 406 to a modified SRAM PUF challenge $C_0'$ 423 by a XORing operation 404 at the memory device 407. At the memory device 407, the RO PUF challenge $C_0$ 412 is used to generate a RO PUF response $R_0$ 421 from the circuit delay PUF 424. Challenge A 416 (i.e., SRAM PUF challenge $C_0$ 406) is then XORed 404 with the RO PUF response $R_0$ 421 to obtain a modified SRAM PUF challenge $C_0'$ 423 which may be used as the challenge for the SRAM PUF 426. The SRAM PUF 426 then generates a SRAM PUF response $R_0'$ 425 that is returned (as response A 418) to the authentication device 400. In this manner, a response from the memory device 407 to the authentication device 400 may include SRAM PUF response $R_0$ 418.

In this approach, the RO PUF response $R_0$ 421 is used to modify the actual challenge to the memory cell region 426. Because an attacker is unable to reproduce the RO PUF response $R_0$ 421, it does not know the modified SRAM PUF challenge $C_0'$ 423 used to produce the response SRAM PUF response $R_0'$ 425.

At the authentication device 400, the device authentication module/circuit/server 403 may verify the SRAM PUF response $R_0'$ 422. This may be done, for example, by XORing 402 the SRAM PUF challenge $C_0$ 406 with the RO PUF response $R_0$ 420 (obtained from the circuit delay PUF database 405) to obtain a local version of the modified SRAM PUF challenge $C_0'$ 427. The local version of the modified SRAM PUF challenge $C_0'$ 427 can then be used to lookup the corresponding response in the SRAM PUF database 401 and compare that response to the received response SRAM PUF response $R_0'$ 422.

Figure 5:
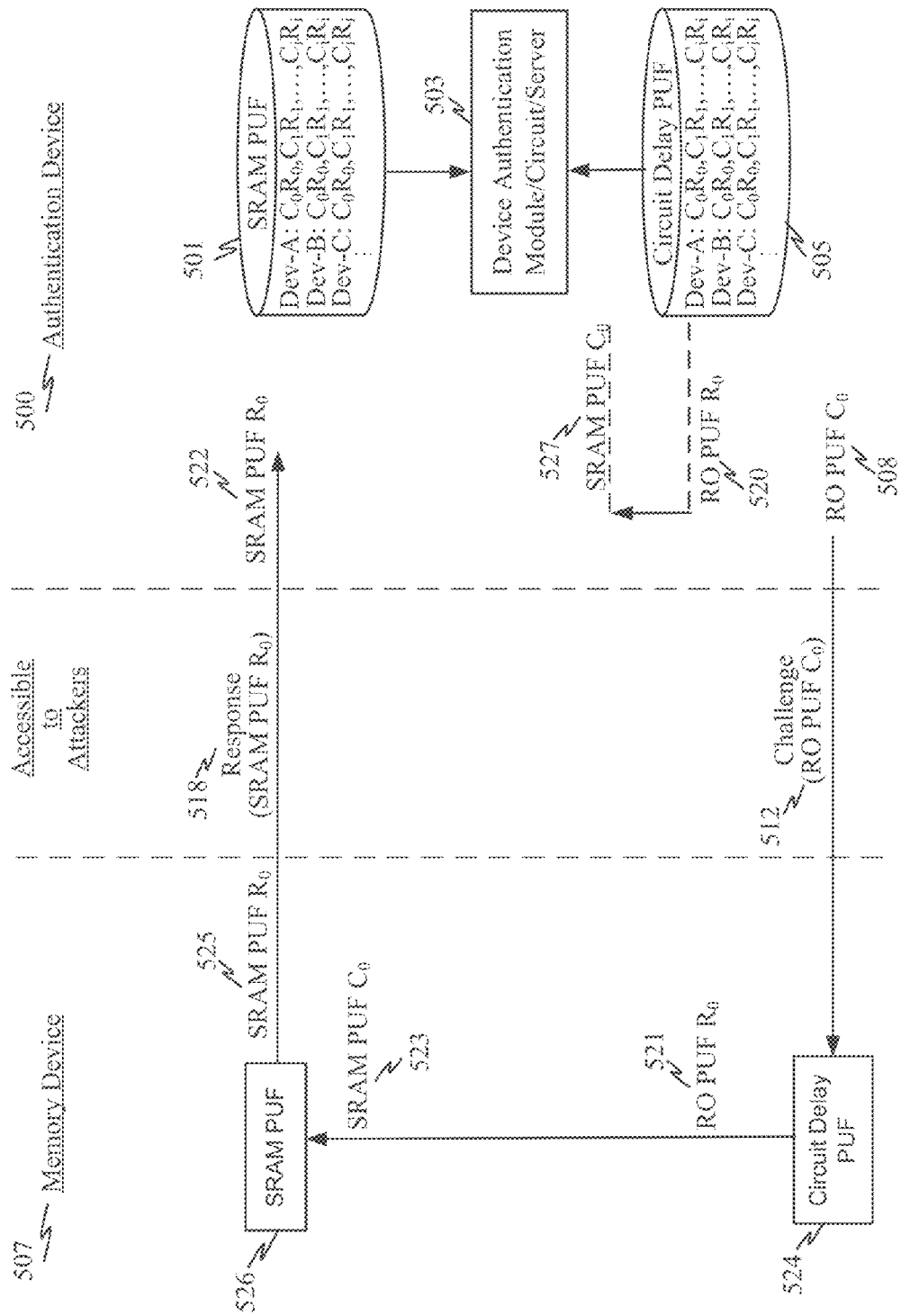
FIG. 5 is a block diagram illustrates a third example of how an SRAM PUF and Circuit Delay PUF may be combined to prevent an attacker from being able to clone a memory device.

FIG. 5 is a block diagram illustrates a third example of how an SRAM PUF 526 and Circuit Delay 524 PUF may be combined to prevent an attacker from being able to clone a memory device. In this example, a authentication device 500 may include a device authentication module/circuit/server 503, a SRAM PUF database 501, and a Circuit Delay PUF database 505. The SRAM PUF database 501 may be generated for a memory cell region of the memory device 507 during manufacturing by, for example, sending a plurality of challenges (e.g., memory addresses) to the memory cell region and obtaining corresponding responses (e.g., uninitialized memory cell states/values). Similarly, the Circuit Delay PUF database 505 may be generated for a plurality of ring oscillator within the memory device 507 during manufacturing by, for example, sending a plurality of challenges (e.g., selection of two ring oscillators) to the ring oscillators and obtaining a corresponding responses (e.g., frequency differential between two selected ring oscillators).

In this example, when the device authentication module/circuit/server 503 subsequently tries to authenticate the memory device 507, it sends a challenge 512, comprising an RO PUF challenge $C_0$ 508, having a corresponding RO PUF response $R_0$.

While RO PUF challenge $C_0$ 512 may be accessible by an attacker, the Circuit Delay PUF 524 cannot be replicated by the attacker. At the memory device 507, the RO PUF challenge $C_0$ 512 is used to generate a RO PUF response $R_0$ 521 from the circuit delay PUF 524. This RO PUF response $R_0$ 521 is then used as the SRAM PUF challenge $C_0$ 523 into the SRAM PUF 526 to obtain the RO PUF response $R_0$ 525. In an alternative approach, the RO PUF response $R_0$ 521 may be used to generate the challenge SRAM PUF $C_0$ 523 (e.g., by mapping or converting the RO PUF response $R_0$ 521 into a memory address). The SRAM PUF response $R_0$ 518 is sent to the authentication device 500

In this approach, the RO PUF response $R_0$ 521 is used to modify the actual challenge to the SRAM PUF 526. Because an attacker is unable to reproduce the RO PUF response $R_0$ 521, it does not know the SRAM PUF challenge $C_0$ 523 used to produce the response SRAM PUF response $R_0$ 525.

At the authentication device 500, the device authentication module/circuit/server 503 may obtain, from the Circuit Delay PUF 505, a RO PUF response $R_0$ 520 corresponding to the sent RO PUF challenge $C_0$ 508. This RO PUF response $R_0$ 520 may serve as the SRAM PUF challenge $C_0$ 527. The device authentication module/circuit/server 403 may verify the SRAM PUF response $R_0$ 422. The SRAM PUF challenge $C_0$ 527 can then be used to lookup the corresponding response in the SRAM PUF database 501 and compare that response to the received response SRAM PUF response $R_0$ 522.

In the approaches illustrated in FIGS. 3, 4, and 5, the device authentication module/circuit/server 303, 403, and/or 503 has access to the challenge and response pairs for both the SRAM PUF and RO PUF. Therefore, the device authentication module/circuit/server 303, 403, and/or 503 is able to verify the operations performed by the memory device 307, 407, and 507 and verify the response(s).

Combining SRAM and RO Physically Unclonable Functions (PUFs) to Mask Responses

In an alternative approach protects the SRAM PUF response from a memory device by use of a RO PUF.

Figure 6:
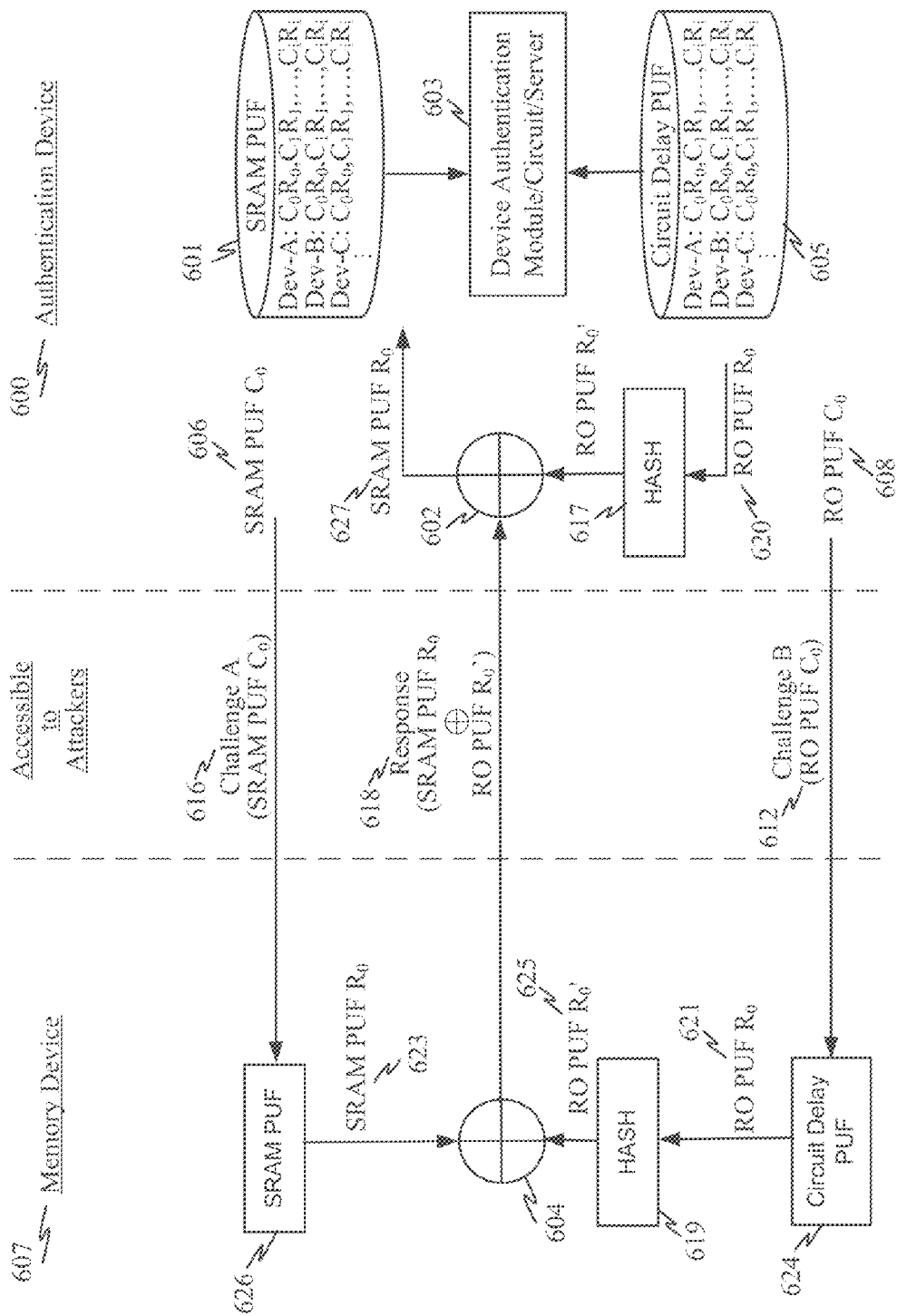
FIG. 6 is a block diagram illustrating a fourth example of how SRAM PUF and RO PUF may be combined to prevent an attacker from being able to clone a memory device.

FIG. 6 is a block diagram illustrating a fourth example of how SRAM PUF 626 and RO PUF 624 may be combined to prevent an attacker from being able to clone a memory device 607. In this example, an authentication device 600 may include a device authentication module/circuit/server 603, a SRAM PUF database 601, and a RO PUF database 605. The SRAM PUF database 601 may be generated for a memory cell region of the memory device 607 during manufacturing by, for example, sending a plurality of challenges (e.g., memory addresses) to the memory cell region and obtaining corresponding responses (e.g., uninitialized memory cell states/values). Similarly, the Circuit Delay PUF database 605 may be generated for a plurality of ring oscillator within the memory device 607 during manufacturing by, for example, sending a plurality of challenges (e.g., selection of two ring oscillators) to the ring oscillators and obtaining a corresponding responses (e.g., frequency differential between two selected ring oscillators).

In this example, when the device authentication module/circuit/server 603 subsequently tries to authenticate the memory device 607, it sends a challenge (comprising Challenge A 616 and Challenge B 612) to the memory device 607. The challenge A 616 may comprise an SRAM PUF challenge $C_0$ 606. The challenge B 612 includes an RO PUF challenge $C_0$ 608 is also sent from the authentication device 600 to the memory device 607.

At the memory device 604, the RO PUF challenge $C_0$ 612 is used to generate a RO PUF response $R_0$ 621 from the circuit delay PUF 624. The SRAM PUF challenge $C_0$ 616 is processed by the SRAM PUF 626 to generate a SRAM PUF response $R_0$ 623. A hash 619 of the RO PUF response $R_0$ 621 is then obtained as RO PUF response $R_0'$ 625. The RO PUF response $R_0'$ 625 is then XORed 604 with the SRAM PUF $R_0$ 623 to obtain a combined response 618 (e.g., SRAM PUF $R_0$ XOR RO PUF response $R_0'$) that is transmitted back to the device authentication module/circuit/server 603. In this manner, the SRAM PUF response $R_0$ 623 from the SRAM PUF 626 the authentication device 600 can be protected during transmission.

At the authentication device 600, the device authentication module/circuit/server 603 may verify that the response 618 corresponds to the sent challenges SRAM PUF $C_0$ 606 and RO PUF $C_0$ 608. For instance, using the circuit delay PUF database 605, the RO PUF response $R_0$ 620 corresponding to the sent RO PUF challenge $C_0$ 608 is obtained. Then, the device authentication module/circuit/server 603 may obtain the SRAM PUF response $R_0$ 627 by hashing 617 the RO PUF response $R_0$ 620 and XORing 602 that result with the response 618 to obtain the SRAM PUF response $R_0$ 627. The SRAM PUF response $R_0$ 627 can then be used to lookup the corresponding response expected for the SRAM PUF challenge $C_0$ 606 in the SRAM PUF database 601. If the responses match, then the memory device 607 is successfully authenticated or identified.

Exemplary Data Collector Device and Method Operational Therein

Figure 7:
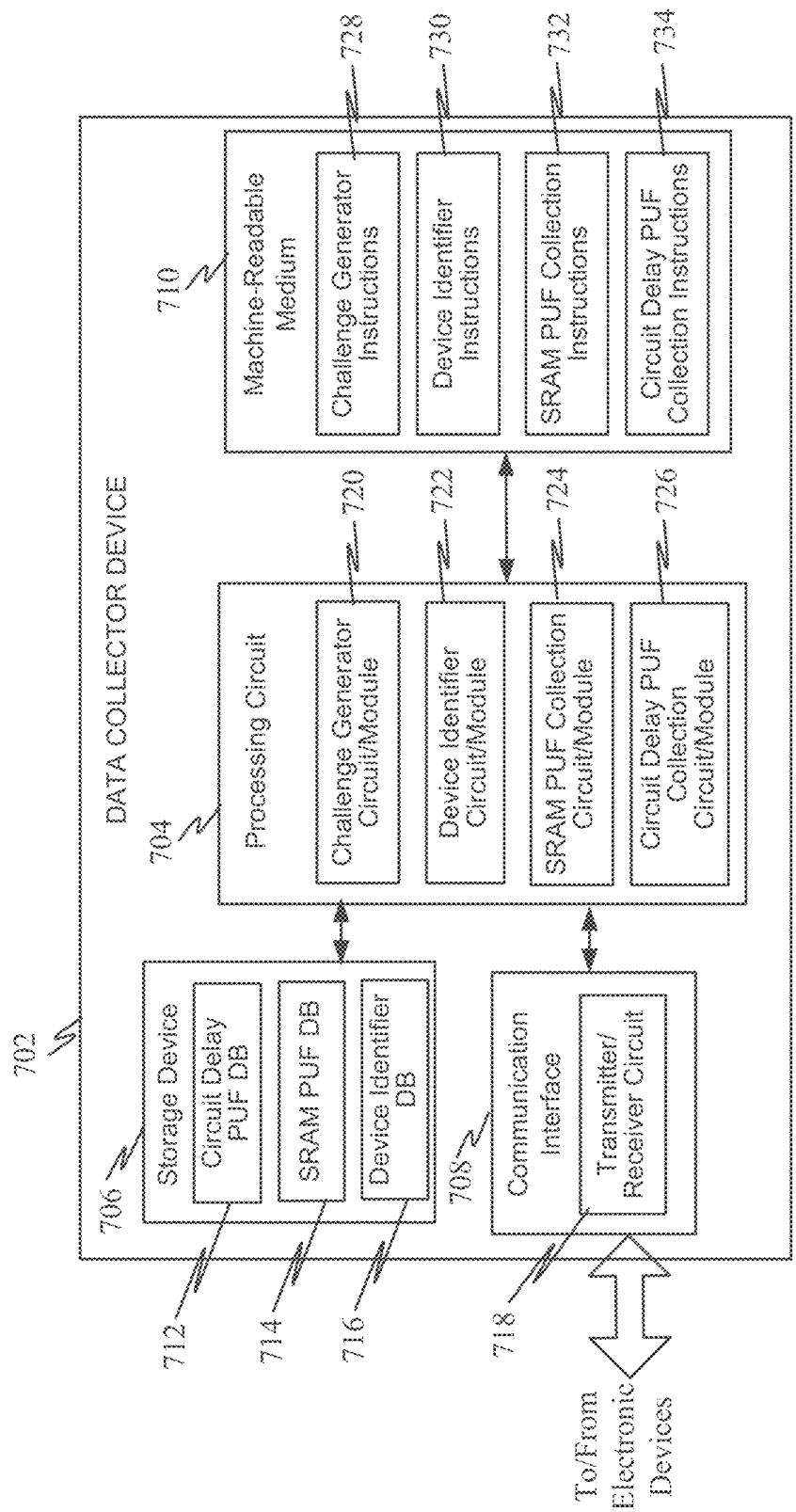
FIG. 7 is a block diagram illustrating a data collector device according to one example.

FIG. 7 is a block diagram illustrating a data collector device according to one example. The data collector device 702 may be adapted to collect and store information that uniquely characterizes electronic devices (e.g., chips, semiconductors, memory devices, etc.). For example, during a manufacturing stage, quality control stage, and/or pre-deployment stage, the data collector device 702 may be adapted to send challenges and receive responses to each electronic device and stores the received information for later use in authenticating/identifying each electronic device.

The data collector device 702 may include a processing circuit 704, a storage device 706, a communication interface 708, and/or a machine-readable medium 710. The communication interface 708 may include a transmitter/receiver circuit 718 that permits the data collector device 702 to communicate (e.g., wired or wirelessly) with one or more electronic devices.

The processing circuit 704 may include a device identifier circuit/module 722 adapted to obtain a unique identifier for each electronic device and store such unique identifier in a device identifier database 716 in the storage device 706. The processing circuit 704 may also include a challenge generator circuit/module 720 adapted to generate and send out one or more challenges to an electronic device. For instance, the challenges may be memory addresses (e.g., for a SRAM PUF) or ring oscillator pairs (e.g., for a RO PUF). The processing circuit 704 may also include an SRAM PUF collection circuit/module 726 adapted to collect responses from an SRAM PUF in an electronic device in response to one or more challenges sent. The processing circuit 704 may also include a circuit delay PUF collection circuit/module 726 adapted to collect responses from a circuit delay PUF in an electronic device in response to one or more challenges sent.

The machine-readable medium 710 may include or store device identifier instructions 730 (e.g., to cause the processing circuit to obtain a device identifier from an electronic device being queried), challenge generator instructions 728 (e.g., to cause the processing circuit to generate/send random or pre-generated challenges to the SRAM PUF and/or circuit delay PUF of the electronic device being queried), SRAM PUF collection instructions 732 (e.g., to cause the processing circuit to collect responses from the SRAM PUF of the electronic device being queried), and/or circuit delay PUF collection instructions 734 (e.g., to cause the processing circuit to collect responses from the circuit delay PUF of the electronic device being queried). Note that, in one example, the circuit delay PUF may be a tamper-resistant PUF. By contrast, the SRAM PUF has been shown to be susceptible to various attacks (e.g., Focused Ion Beam (FIB) attacks, circuit edit attacks, etc.).

The data collector device 702 may be adapted to perform one or more of the steps or functions illustrated in FIGS. 1-6.

Figure 8:
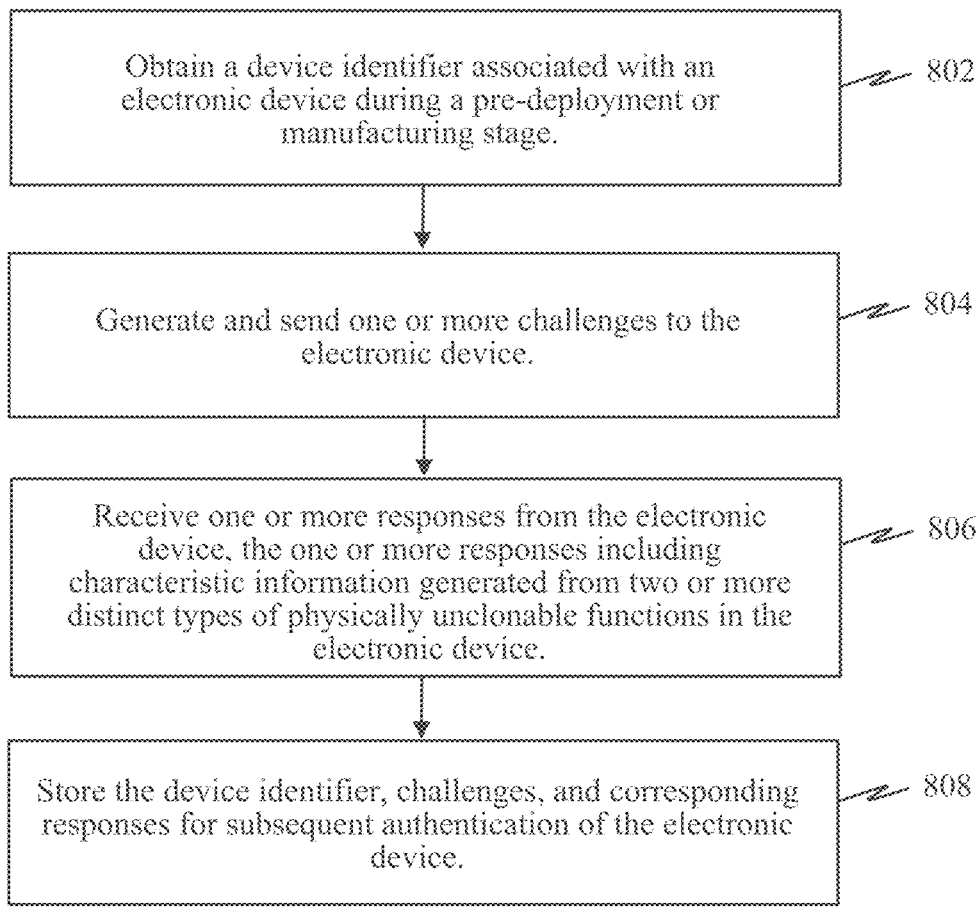
FIG. 8 illustrates a method operational in a data collector device for obtaining characteristic information from an electronic device.

FIG. 8 illustrates a method operational in a data collector device for obtaining characteristic information from an electronic device. The data collector device may obtain (e.g., receive or assign) a device identifier associated with an electronic device during a pre-deployment or manufacturing stage 802. The data collector device may then generate and send one or more challenges to the electronic device 804. As a result, the data collector device may receive one or more responses from the electronic device, the one or more responses including characteristic information generated from two or more distinct types of physically unclonable functions in the electronic device 806. The device identifier, challenges, and corresponding responses are stored for subsequent authentication of the electronic device 808. This process may be repeated for each of a plurality of electronic devices. Note that the challenges sent to the electronic devices may be the same for all devices, may be randomly generated for each electronic device, and/or may be a subset of possible challenges.

Exemplary Authentication Device and Method Operational Therein

Figure 9:
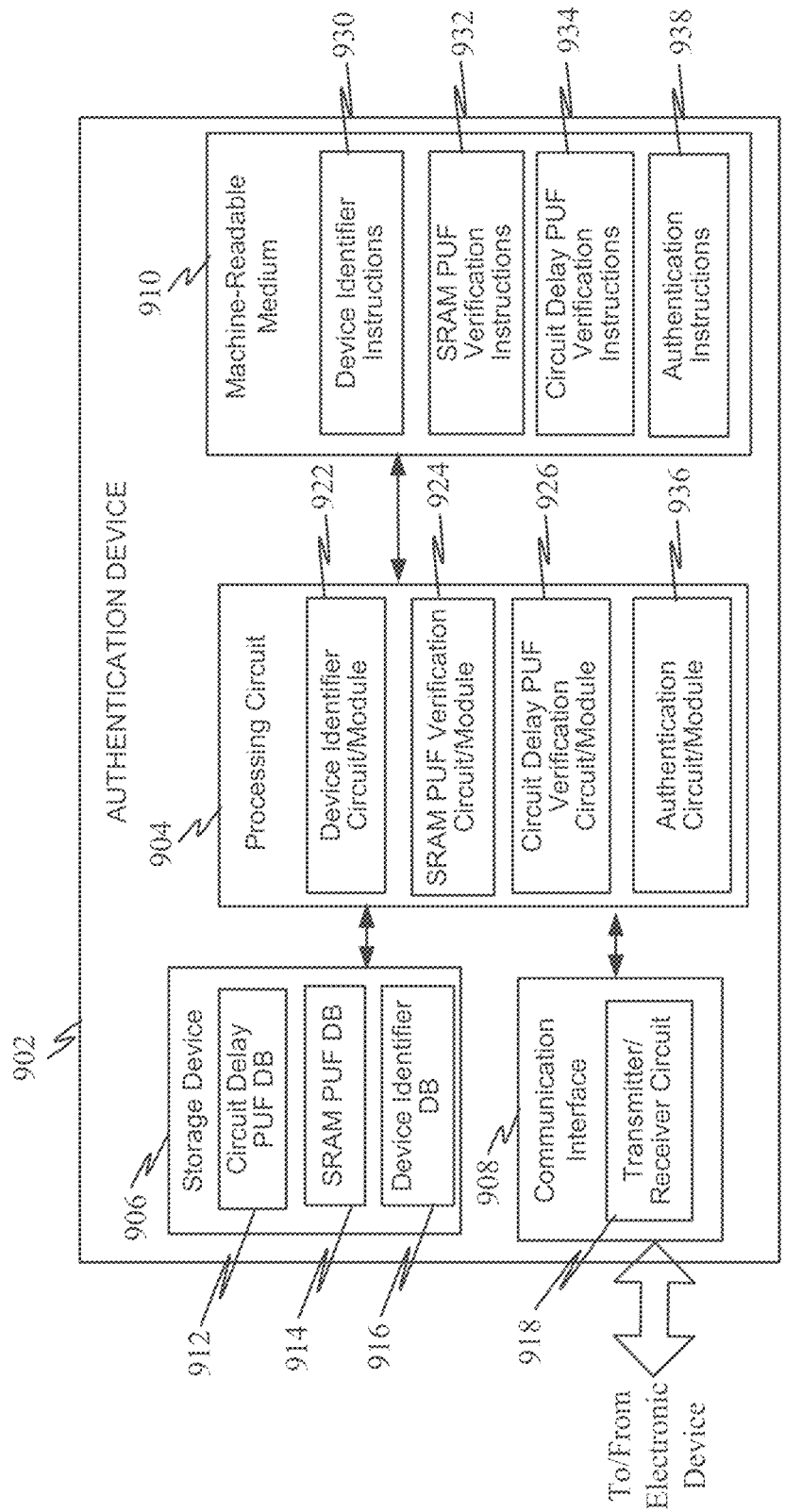
FIG. 9 is a block diagram illustrating an exemplary authentication device adapted to authenticate an electronic device based on responses from multiple physically unclonable functions within each electronic device.

FIG. 9 is a block diagram illustrating an exemplary authentication device adapted to authenticate an electronic device based on responses from multiple physically unclonable functions within each electronic device. The authentication device 902 may be adapted to query an electronic device (e.g., chip, semiconductor, memory devices, etc.) and attempt to identify the electronic device based on a device identifier (e.g., obtained from the electronic device) and authenticate the electronic device by performing a query involving challenges to an SRAM PUF and circuit delay PUF in the electronic device. The authentication device 902 may include a processing circuit 904, a storage device 906, a communication interface 908, and/or a machine-readable medium 910. The communication interface 908 may include a transmitter/receiver circuit 918 that permits the authentication device 902 to communicate (e.g., wired or wirelessly) with one or more electronic devices.

The processing circuit 904 may include a device identifier circuit/module 922 adapted to obtain a unique device identifier from an electronic device. Using the obtained device identifier, an authentication circuit/module 936 may check a device identifier database 916 (in the storage device 906) for the corresponding challenge/response information associated with that device identifier. The authentication circuit/module 936 in cooperation with a SRAM PUF verification circuit/module 924 and circuit delay PUF verification circuit/module 926 may then send one or more of the corresponding challenges to the electronic device and obtains one or more responses to the challenges. Note that, in one example, the circuit delay PUF may be a tamper-resistant PUF. By contrast, the SRAM PUF has been shown to be susceptible to various attacks (e.g., Focused Ion Beam (FIB) attacks, circuit edit attacks, etc.).

The responses, in conjunction with the challenges, may be used by the SRAM PUF verification circuit/module 924 and circuit delay PUF verification circuit/module 926 to ascertain, from a SRAM PUF database 914 (in the storage device 906) and a circuit delay PUF database 912 (in the storage device 906), respectively, whether they correctly match the expected response (i.e., match the responses corresponding to the challenges in the databases 914 and 916). If the received responses match the previously stored corresponding responses, the authentication circuit/module 936 may conclude that the electronic device is successfully authenticated. Such successful authentication may be a probabilistic match, where as long as a threshold percentage or number of responses are correctly matched, a successful match may be concluded.

The machine-readable medium 910 may include or store device identifier instructions 930 (e.g., to cause the processing circuit to obtain a device identifier from an electronic device being verified), SRAM PUF verification instructions 932 (e.g., to cause the processing circuit to verify responses from the SRAM PUF of the electronic device being verified), circuit delay PUF verification instructions 934 (e.g., to cause the processing circuit to verify responses from the circuit delay PUF of the electronic device being verified), and/or authentication instructions 938 to ascertain whether both SRAM PUF and circuit delay PUF verification has been successful.

The data collector device 902 may be adapted to perform one or more of the steps or functions illustrated in FIGS. 1-6.

Figure 10:
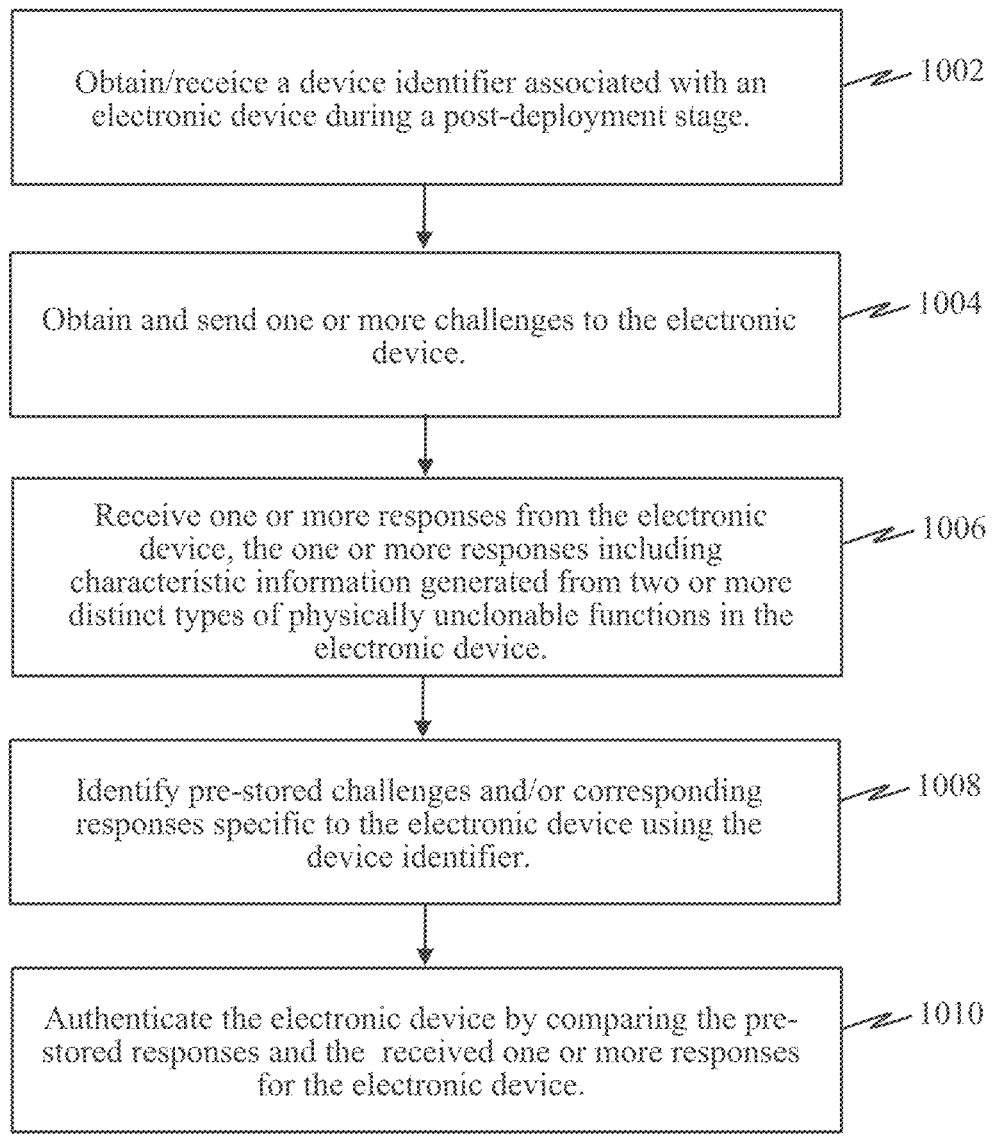
FIG. 10 illustrates a method operational in an authentication device for authenticating an electronic device based on responses from a plurality of physically unclonable functions.

FIG. 10 illustrates a method operational in an authentication device for authenticating an electronic device based on responses from a plurality of physically unclonable functions. The authentication device may obtain (e.g., request or receive) a device identifier associated with an electronic device during a post-deployment stage 1002. The authentication device may obtain and send one or more challenges to the electronic device 1004. For example, the challenges may be a pre-defined set of challenges utilized for all electronic devices. Alternatively, the challenges may be a specific subset of challenges for the electronic device obtained from a database using the device identifier. As a result of sending the one or more challenges, the authentication device may receive one or more responses from the electronic device, the one or more responses including characteristic information generated from two or more distinct types of physically unclonable functions in the electronic device 1006. In various implementations, the authentication device may operate as illustrated and described with reference to FIGS. 1, 2, 3, 4, 5, and/or 6.

The device identifier may be used to identify pre-stored challenges and corresponding responses specific to the electronic device 1008. The authentication device may then authenticate the electronic device by comparing the pre-stored responses and the received one or more responses for the electronic device 1010. Successful authentication occurs when the received one or more responses match the pre-stored responses for the electronic device. Successful authentication may be a probabilistic match, where as long as a threshold percentage or number of responses are correctly matched, a successful match may be concluded. This process may be repeated for each of a plurality of electronic devices. Since physically unclonable functions are used by each electronic device, the one or more responses will be distinct even if the same challenge is used for all devices.

Exemplary Electronic Device and Method Operational Therein

Figure 11:
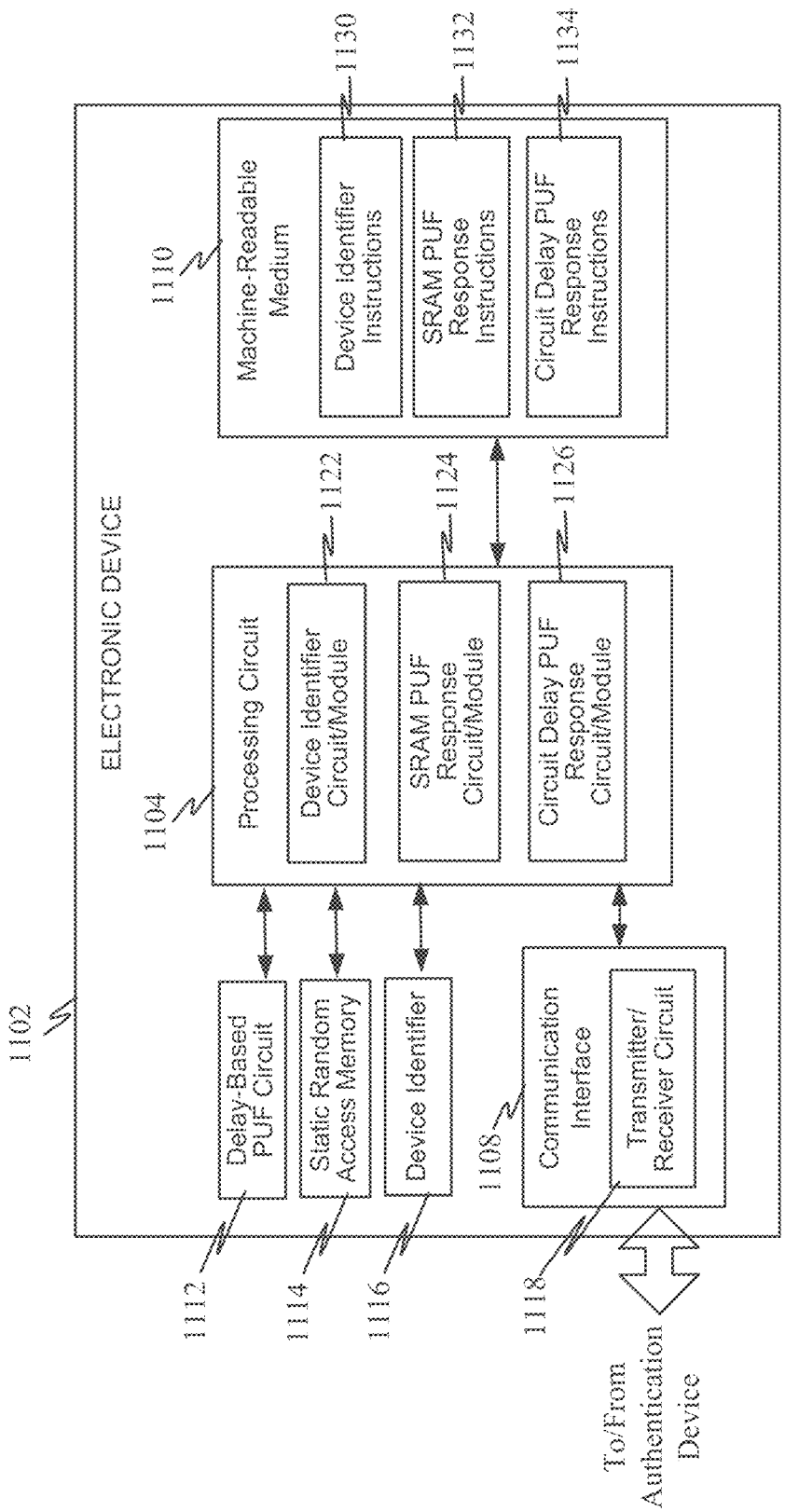
FIG. 11 is a block diagram illustrating an exemplary electronic device having multiple physically unclonable functions.

FIG. 11 is a block diagram illustrating an exemplary electronic device having multiple physically unclonable functions. The electronic device 1102 may be a chip, semiconductor, memory devices, etc., and adapted to provide a device identifier and respond to challenges to an SRAM PUF and circuit delay PUF in the electronic device. The electronic device 1102 may include a processing circuit 1104, a device identifier 1116 (in a storage device), a delay-based PUF circuit 1112 (e.g., plurality of oscillator ring circuits), a static random access memory 1116 (which may be used as an SRAM PUF), a communication interface 1108, and/or a machine-readable medium 1110. The communication interface 1108 may include a transmitter/receiver circuit 1118 that permits the electronic device 1102 to communicate (e.g., wired or wirelessly) with one or more data collector and/or authentication devices.

The processing circuit 1104 may include a device identifier circuit/module 1122 adapted to provide its unique device identifier 1116 to a data collector and/or authentication device. The processing circuit may also include a SRAM PUF Response circuit/module 1124 and a circuit delay PUF Response circuit/module 1126 that are adapted to obtain responses to received challenges and send the responses to a data collector device and authentication devices. Note that, in one example, the circuit delay PUF may be a tamper-resistant PUF. By contrast, the SRAM PUF has been shown to be susceptible to various attacks (e.g., Focused Ion Beam (FIB) attacks, circuit edit attacks, etc.).

The SRAM PUF Response circuit/module 1124 may send received challenges to the static random access memory 1114 to obtain responses. For example, responses may be the uninitialized states of one or more memory cells of the static random access memory 1114. Similarly, the circuit delay PUF Response circuit/module 1126 may send received challenges to the delay-based PUF circuit 1112 to obtain responses.

The machine-readable medium 1110 may include or store device identifier instructions 1130 (e.g., to cause the processing circuit to obtain the device identifier 1116 for the electronic device), SRAM PUF response instructions 1132 (e.g., to cause the processing circuit to obtain responses from the static random access memory 1114 of the electronic device), and/or circuit delay PUF response instructions 1134 (e.g., to cause the processing circuit to obtain responses from the circuit delay PUF of the electronic device).

The electronic device 1102 may be adapted to perform one or more of the steps or functions illustrated in FIGS. 1-6.

FIG. 12 illustrates a method operational in an electronic device for authenticating itself with an authentication device based on a response from a plurality of physically unclonable functions. The electronic device may have received one or more challenges and provided one or more corresponding responses during a pre-deployment or manufacturing phase.

The electronic device implements a first physically unclonable function using a plurality of memory cells within the electronic device 1204. In one example, the first physically unclonable function may use the uninitialized memory cell states for one or more memory cells as a response to the challenge.

The electronic device may also implement a second physically unclonable function using a plurality of circuit delay based paths within the electronic device 1206. In one example, the plurality of circuit delay based paths and/or is otherwise tamper-resistant. The term "tamper-resistant" refers to an implementation or type of a PUF that when an attempt is made to tamper with it to predict, ascertain, and/or read its response or output, this causes the response and/or output to change. For example, an attempt to physically tamper with a ring oscillator or circuit delay path type oscillator would cause the response for the ring oscillator or circuit delay path to be altered (e.g., output frequency changes).

A challenge may be received from an external server 1208. The challenge may be applied to the first physical unclonable function by using a first response from the second physically unclonable function to either: (a) mask/unmask a challenge input to the first physically unclonable function, (b) generate the challenge input to the first physical unclonable function, or (c) mask a response output from the first physically unclonable function 1210. In one example, the first challenge may identify memory addresses within the plurality of memory cells. In another example, the challenge may select two ring oscillators from the plurality of ring oscillators in the second physically unclonable function and responds with a frequency differential between the two ring oscillators. The challenge may be received as part of at least one of: an authentication process of the electronic device, an identification process of the electronic device, and/or a key generation process within the electronic device.

The first response from the second physically unclonable function and/or a second response from the first physically unclonable function may then be sent to the external server 1212. The external server may include a first database of challenges and responses for the first physically unclonable function and a second database of challenges and responses for the second physically unclonable function, where the external server sends the challenge to the electronic device and authenticates or identifies the electronic device based on the second response.

An indicator may be received that the response was successfully verified by the external server 1214. For instance, upon successful authentication, the electronic device may receive an indicator that it has gained access to a network and/or data.

In one example, the challenge includes a first challenge for the first physically unclonable function and a second challenge for the second physically unclonable function. For instance, the first challenge may be a challenge masked by an expected response to second challenge (as illustrated in FIG. 3). In another instance, the first challenge may be modified by the first response from the second physically unclonable function prior to processing by the first physically unclonable function (as illustrated in FIG. 4).

In yet another example, the received challenge may be used by the second physically unclonable function to generate the first response which is then used as a second challenge by the first physically unclonable function to generate the second response (as illustrated in FIG. 5).

In another implementation, the challenge may include a first challenge for the first physically unclonable function and a second challenge for the second physically unclonable function, the second challenge may be used by the second physically unclonable function to generate the first response which is used to mask the second response from the first physically unclonable function (as illustrated in FIG. 6). The method may further include: (a) hashing the first response from the second physically unclonable function to obtain an intermediate response; and/or (b) masking the second response using the intermediate response.

In one example, a pre-stored device identifier may also be pre-provisioned within the electronic device 1202. It may send the pre-stored device identifier from the electronic device to the external server either: (a) before the challenge is received, or (b) concurrent with sending the second response. The device identifier uniquely identifies the electronic device.

One or more of the components, steps, features, and/or functions illustrated in FIGS. 1-12 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 1-7, 9, and 11 may be configured to perform one or more of the methods, features, or steps described in FIGS. 8, 10 and 12. The algorithms described herein may also be efficiently implemented in software and/or embedded in hardware.

Moreover, in one aspect of the disclosure, the processing circuit 704, 904 and 1104 illustrated in FIGS. 7, 9 and 11 may be specialized processors (e.g., an application specific integrated circuit (e.g., ASIC)) that are specifically designed and/or hard-wired to perform the algorithms, methods, and/or steps described in FIGS. 8, 10, and 12, respectively. Thus, such a specialized processor (e.g., ASIC) may be one example of a means for executing the algorithms, methods, and/or steps described in FIGS. 8, 10, and 12.

Also, it is noted that the aspects of the present disclosure may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, aspects of the disclosure may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method operational by an authentication device, comprising:
   receiving a device identifier associated with an electronic device;
   sending a circuit delay-based physically unclonable function (PUF) challenge and a memory cell-based PUF challenge to the electronic device;
   receiving a response from the electronic device, the response including characteristic information generated from a memory cell-based PUF and a circuit-delay based PUF in the electronic device;
   identifying pre-stored responses specific to the electronic device using the electronic device identifier; and
   authenticating the electronic device by comparing the pre-stored responses and the response received.

2. The method of claim 1, wherein the memory cell-based PUF challenge and the circuit delay-based PUF challenge are selected from a plurality of challenges for which responses were previously obtained from the electronic device.

3. The method of claim 1, wherein the pre-stored responses were obtained at a manufacturing stage or pre-deployment stage of the electronic device.

4. The method of claim 1, wherein the device identifier is received prior to sending the circuit delay-based PUF challenge and the memory cell-based PUF challenge.

5. The method of claim 1, wherein the device identifier is received along with the response.

6. The method of claim 1, wherein the memory cell-based PUF challenge sent to the electronic device is a challenge masked by a pre-stored response to the circuit-delay based PUF challenge.

7. An authentication device, comprising:
   a communication interface to communicate with an electronic device; and
   a processing circuit communicatively coupled to the communication interface, wherein the processing circuit is adapted to:
   receive a device identifier associated with the electronic device;

send a circuit delay-based physically unclonable function (PUF) challenge and a memory cell-based PUF challenge to the electronic device;
receive a response from the electronic device, the response including characteristic information generated from a memory cell-based PUF and a circuit-delay based PUF in the electronic device;
identify pre-stored responses specific to the electronic device using the electronic device identifier; and
authenticate the electronic device by comparing the pre-stored responses and the response received.

8. The authentication device of claim 7, wherein the memory cell-based PUF challenge and the circuit delay-based PUF challenge are selected from a plurality of challenges for which responses were previously obtained from the electronic device.

9. The authentication device of claim 7, wherein the memory cell-based PUF challenge sent to the electronic device is a challenge masked by a pre-stored response to the circuit-delay based PUF challenge.

10. An authentication device, comprising:
means for receiving a device identifier associated with an electronic device;
means for sending a circuit delay-based physically unclonable function (PUF) challenge and a memory cell-based PUF challenge to the electronic device;
means for receiving a response from the electronic device, the response including characteristic information generated from a memory cell-based PUF and a circuit-delay based PUF in the electronic device;
means for identifying pre-stored responses specific to the electronic device using the electronic device identifier; and
means for authenticating the electronic device by comparing the pre-stored responses and the response received.

11. A non-transitory machine-readable storage medium having one or more instructions stored thereon, which when executed by at least one processor causes the at least one processor to:
receiving a device identifier associated with an electronic device;
send a circuit delay-based physically unclonable function (PUF) challenge and a memory cell-based PUF challenge to the electronic device;
receive a response from the electronic device, the response including characteristic information generated from a memory cell-based PUF and a circuit-delay based PUF in the electronic device;
identify pre-stored responses specific to the electronic device using the electronic device identifier; and
authenticate the electronic device by comparing the pre-stored responses and the response received.

12. The method of claim 6, wherein authenticating the electronic device by comparing the pre-stored responses and the response received includes:
determining that the response received matches or is a function of a pre-stored response for the memory cell-based PUF challenge.

13. The method of claim 1, wherein authenticating the electronic device by comparing the pre-stored responses and the response received includes:
obtaining an intermediate challenge based on a function of the memory cell-based PUF challenge and a pre-stored response to the circuit delay-based PUF challenge; and
determining that the response received matches or is a function of a stored response for the intermediate challenge.

14. The method of claim 13, further comprising:
obtaining the intermediate challenge by performing an exclusive OR operation on the memory cell-based PUF challenge with the pre-stored response to the circuit delay-based PUF challenge.

15. The method of claim 1, wherein authenticating the electronic device by comparing the pre-stored responses and the response received includes:
obtaining a modified response based on a function of the response received and a pre-stored response for the circuit delay-based PUF challenge; and
determining that the modified response matches or is a function of the memory cell-based PUF response.

16. The method of claim 15, further comprising:
obtaining the modified response by performing an exclusive OR operation on the response received with one of (i) the pre-stored response for the circuit delay-based PUF challenge, or (ii) a cryptographic hash of the pre-stored response for the circuit delay-based PUF challenge.

17. The authentication device of claim 9, wherein the processing circuit adapted to authenticate the electronic device by comparing the pre-stored responses and the response received includes the processing circuit adapted to:
determine that the response received matches or is a function of a pre-stored response for the memory cell-based PUF challenge.

18. The authentication device of claim 7, wherein the processing circuit adapted to authenticate the electronic device by comparing the pre-stored responses and the response received includes the processing circuit adapted to:
obtain an intermediate challenge based on a function of the memory cell-based PUF challenge and a pre-stored response to the circuit delay-based PUF challenge; and
determine that the response received matches or is a function of a stored response for the intermediate challenge.

19. The authentication device of claim 18, wherein the processing circuit is further adapted to:
obtain the intermediate challenge by performing an exclusive OR operation on the memory cell-based PUF challenge with the pre-stored response to the circuit delay-based PUF challenge.

20. The authentication device of claim 7, wherein the processing circuit adapted to authenticate the electronic device by comparing the pre-stored responses and the response received includes the processing circuit adapted to:
obtain a modified response based on a function of the response received and a pre-stored response for the circuit delay-based PUF challenge; and
determine that the modified response matches or is a function of the memory cell-based PUF response.

21. The authentication device of claim 20, wherein the processing circuit is further adapted to:
obtain the modified response by performing an exclusive OR operation on the response received with one of (i) the pre-stored response for the circuit delay-based PUF challenge, or (ii) a cryptographic hash of the pre-stored response for the circuit delay-based PUF challenge.

* * * * *